United States Patent [19]

Seigneur et al.

[11] Patent Number: 4,855,650
[45] Date of Patent: Aug. 8, 1989

[54] GRAPHIC PROCESSOR OUTPUT DYNAMIC RANGE CORRECTOR SYSTEM FOR ANALYSIS OF BRIGHTNESS CONTRAST

[75] Inventors: Jean-Michel Seigneur, Petit Quevilly; Jean-Pierre Menu, Creteil, both of France

[73] Assignee: ETAT Francais, France

[21] Appl. No.: 936,760

[22] Filed: Dec. 2, 1986

[30] Foreign Application Priority Data

Dec. 5, 1985 [FR] France .................. 85 17992

[51] Int. Cl.$^4$ ........................................ H01J 29/52
[52] U.S. Cl. .................................. 315/383; 128/633; 358/168
[58] Field of Search ............... 315/383; 358/169, 168; 340/793; 128/633

[56] References Cited

U.S. PATENT DOCUMENTS

| | | | |
|---|---|---|---|
| 4,030,125 | 6/1977 | Bedell et al. ........................ | 358/169 |
| 4,527,197 | 7/1985 | Nolte ................................... | 315/383 |

Primary Examiner—Theodore M. Blum
Attorney, Agent, or Firm—Oliff & Berridge

[57] ABSTRACT

The graphic processor output dynamic range corrector system according to the present invention includes an input adapter for receiving a brightness signal from a graphic processor, an attenuator with an adjustable attenuation coefficient connected to the output of the input adapter, a reference voltage generator with an adjustable voltage level, a summing circuit for receiving output signals from the attenuator and reference voltage generator and for producing a corrected brightness signal, and decoding logic circuits connected to a computer connected to the graphic processor via an input interface, and connected to the attenuator and the reference voltage generator to control adjustment of the attenuation coefficient of the attenuator and the reference voltage level of the generator. The correction generator can be used in a brightness contrast analysis instrument equipped with a CRT to display stimuli at various spatial and time frequencies.

7 Claims, 3 Drawing Sheets

GRAPHIC PROCESSOR OUTPUT DYNAMIC RANGE CORRECTOR SYSTEM FOR ANALYSIS OF BRIGHTNESS CONTRAST

This invention relates to instruments for analyzing brightness contrast, including a graphic processor, a computer and a cathode ray tube for display of stimuli at various spatial and time frequencies.

To determine brightness contrast sensitivity (CS) of an individual, ophthalmologists have already built systems using computers and low frequency generators, adopting an analog technique, or using graphic processing, adopting digital techniques. These systems allow display of sinusoidal patterns on a screen.

The systems already developed however are expensive, bulky and complicated to use, generally do not allow fine measurement of the CS where the eye is most sensitive and do not take into account the color parameter.

In particular, systems involving digital techniques include a computer or microcomputer for automation of the tests and a graphic connected to the computer and controlling a conventional monochrome CRT to display sinusoidal patterns of variable widths which are the test stiumli used to measure the CS.

However, in addition to lacking the capability to provide color stimuli, the known CS test control systems have drawbacks since they do not take into account the fact that the sensitivity of the eye depends on the spatial frequency stimulating it. The graphic processors used in known systems for determining the CS are inaccurate in the medium frequencies where the contrasts presented must be very low since the eye is most sensitive to these frequencies.

It is an object of the invention to overcome the above drawbacks and to allow display of images formed by illuminance-contrasted sinusoidal patterns whose spatial and time frequencies, average illuminance and contrast can be adapted in a simple way to allow display of very low contrasts without requiring a graphic processor capable of a very large number of steps or modifying the linearity of the processor response curves.

The invention is used to analyze the perception of complex images by subjects with various optical defects by stimulating the vision and to simulate degraded vision conditions.

These objects are achieved by a graphic processor output dynamic range corrector system which can be used in particular in a brightness contrast analysis instrument of the type including a computer, the processor and a CRT to display stimuli at various spatial and time frequencies, characterized by the fact that it includes an input adapter for receiving a brightness signal from the graphic processor, an attenuator with a variable attenuation coefficient connected to the output of the input adpater, a reference voltage generator with an adjustable level, a summing circuit receiving the output signals from the attenuator and the reference voltage generator and initial decoding logic circuits connected to the computer via an input interface and to the attenuator and the reference voltage generator to control the adjustment of the attenuation coefficient (Kg) of the attenuator and the reference voltage level (Vcg) of the reference voltage generator.

The values of the attenuation coefficient (Kg) of the attenuator and the reference voltage level (Vcg) of the reference voltage generator are distributed as a series of discrete values forming ranges of different sensitivity for the same number of elementary brightness levels output by the graphic processor.

Therefore, the attenuator and reference voltage generator can be designed as an adjustable resistive circuit controlled by the first decoding logic circuits.

Another characteristic of the invention is that the output of the summing circuit is connected to three switching logic circuits: red, green, blue, directing the patterns of signals from the summing circuit to a red gun, a green gum and a blue gun respectively of the color CRT via normalizing circuits.

In this case, the system includes means for manually adjusting the excitation level of each of the three guns: red, green and blue and second decoding logic circuits receivng the control signals output by the computer via the input interface and a vertical synchronization signal output by the graphic processor to control the switch from inidividual operation of the red, green, blue switching logic circuits to simultaneous operation creating neutral areas on the CRT.

Other characteristics and advantages of the invention will be seen from the following description of a particular embodiment, given as example with reference to the drawings in appendix, where:

The main modules comprising a dynamic range corrector system 3 according to the invention, usable with a graphic processor 2 on which the number of gray levels is limited, for instance, to 256 and which, with computer 1 and color CRT 4 allows easy and fine measurement of the CS in color are described with reference to FIG. 1.

Figure 1:
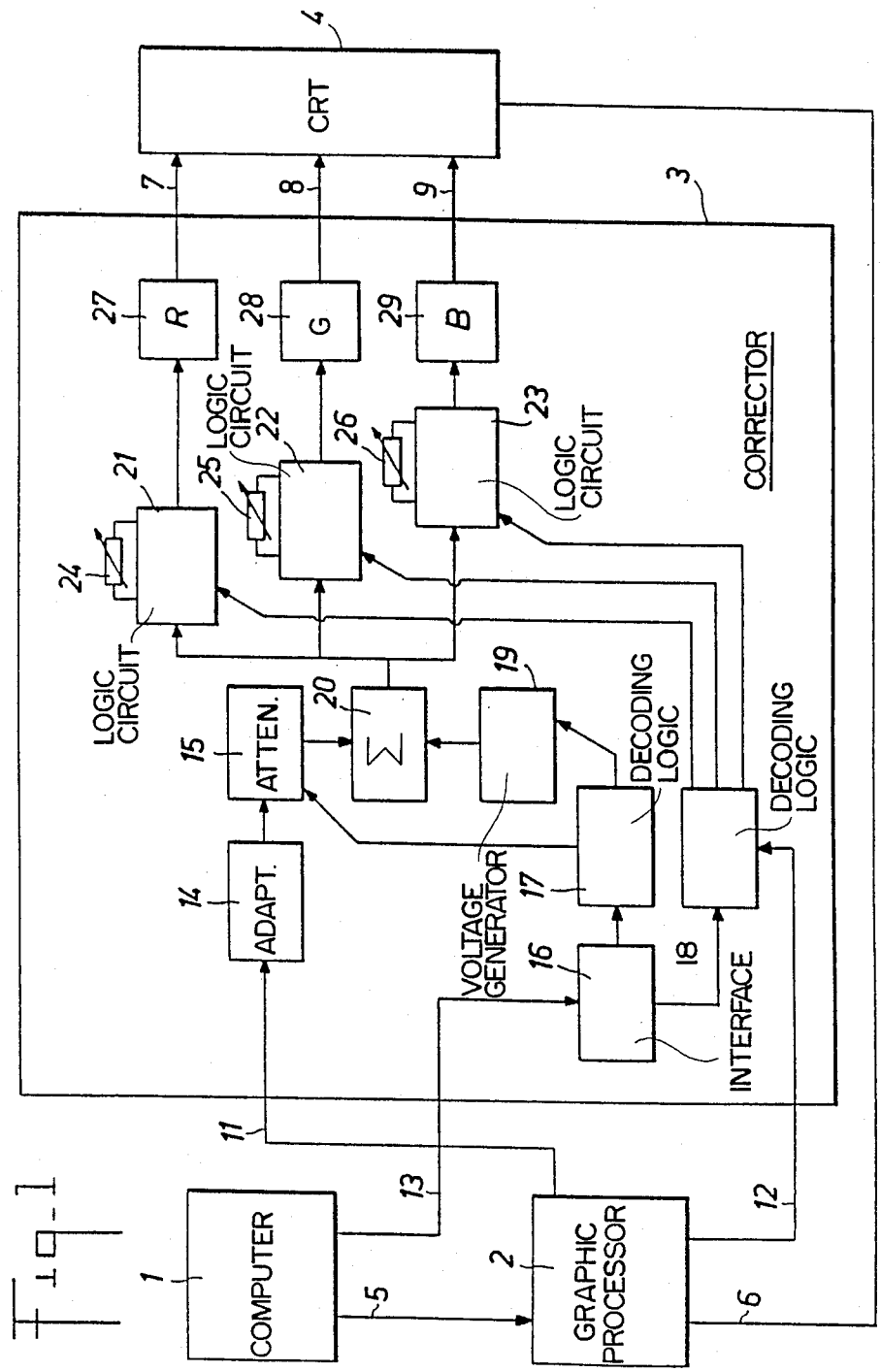
FIG. 1 represents the general simplified block diagram of a graphic processor output dynamic range corrector system according to the invention.

The system of FIG. 1 thus includes computer 1 connected to graphic processor 2 by link 5 and to corrector 3 by link 13, and CRT 4. Processor 2 is also connected to corrector 3 by link 11 and to CRT 4 by link 6. Corrector 3 outputs three sets of signals supplying the CRT by links 7, 8 and 9.

The basic module of corrector 3 according to the invention includes first attenuator 15 connected via input adapter 14 to output 11 of black and white graphic processor 2 providing an input voltage representing the brightness signal. Input adapter 14 applies to the corrector the standard impedance, for instance 75 ohms, which must be applied to any graphic processor under normal operating conditions. Attenuator 15 applies to input voltage Ve from input adpater 14 an attenuation coefficient Kg whose value depends on the range selected. Selection of a range from the various available ranges is made from the signals supplied by line 13 of the link to a computer connected to input interface 16 which applies control signals to first decoding logic circuits 17 to select in particular the value of coefficient Kg of attenuator 15 according to the range selected.

The basic corrector module also includes reference voltage generator 19 which is also controlled by the first decoding logic circuits 17 to apply a constant correction voltage Vcg, according to the range selected (see below, equation (3)) to one input of summing circuit 20, the other input of which receives the attenuated voltage singals from attenuator 15. The signal on the output of summing circuit 20 thus corresponds to the sum of the voltages from attentuator 15 and from reference voltage generator 19.

The fewer the steps of the graphic processor, the more ranges are included in a complete dynamic range corrector which actually includes, considering the values of attenuation coefficient Kg and constant correction voltage Vcg which differ for the different ranges, a batter of attenuators and reference voltage generators, with the selection of a pair of these units determined directly from the range and color selections.

This selection is controlled, for instance, by a serial type link from the computer associated with the graphic processor. The link with the computer can be a serial line with a low data rate, for instance 9600 bauds, which requires the use of a universal asynchronous receiver-transmitter (UART) as input interface 16. On the ouput of this interface, four bits are used to determine the useful range. The N batteries (attenuator 15 and reference generator 19) are then controlled by these four bits by logic decoder circuits 17 to select a pair of units out of N pairs.

Figure 5:
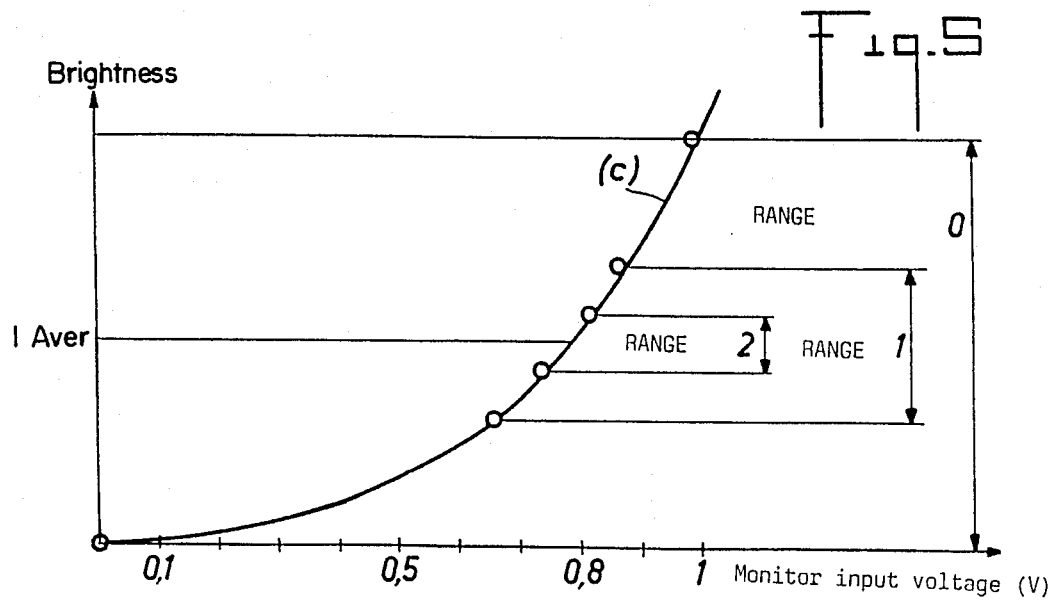
FIG. 5 shows the brightness curve versus the voltage applied to the input of a CRT and the different voltage ranges which can be used according to the invention to increase constrast sensitivity.

The dynamic range corrector shown in FIG. 5 is also a system which converts a black and white graphic processor and a CS measuring instrument to a color system by the presence of three logic switching circuits, 21, 22, 23. These three switching logic circuits serve a dual purpose. First, on presentation of the patterns from summing circuit 20, they direct the useful signal to the red gun, the green gun or the blue gun of the CRT and they also create white areas (i.e. neutral) on the color CRT. To create neutral areas, it is necessary to simultaneously excite the red, green and blue guns at different levels. These different levels can be adjusted manually by adjustable resistors 24, 25, 26 associated with switching logic circuits 21, 22, 23.

In order to avoid any separations in the image, the transitions between patterns and neutral range must mandatorily be made during vertical flyback. This is achieved by the presence of second logic decoding circuits 18 which receive the signals from the computer via input interface 16 and from the graphic processor (link 12 for sending vertical synchronization signals) and which are connected to three switching logic circuits, 21, 22, 23 to which they send control signals.

Level conditioning and normalizing circuits 27, 28, 29 on the ouput of logic switching circuits 21, 22, 23 provide an output level included in a predetermined range, for instance between O V and 1 V, and create a standard output impedance, for instance 75 ohms.

Figure 2:
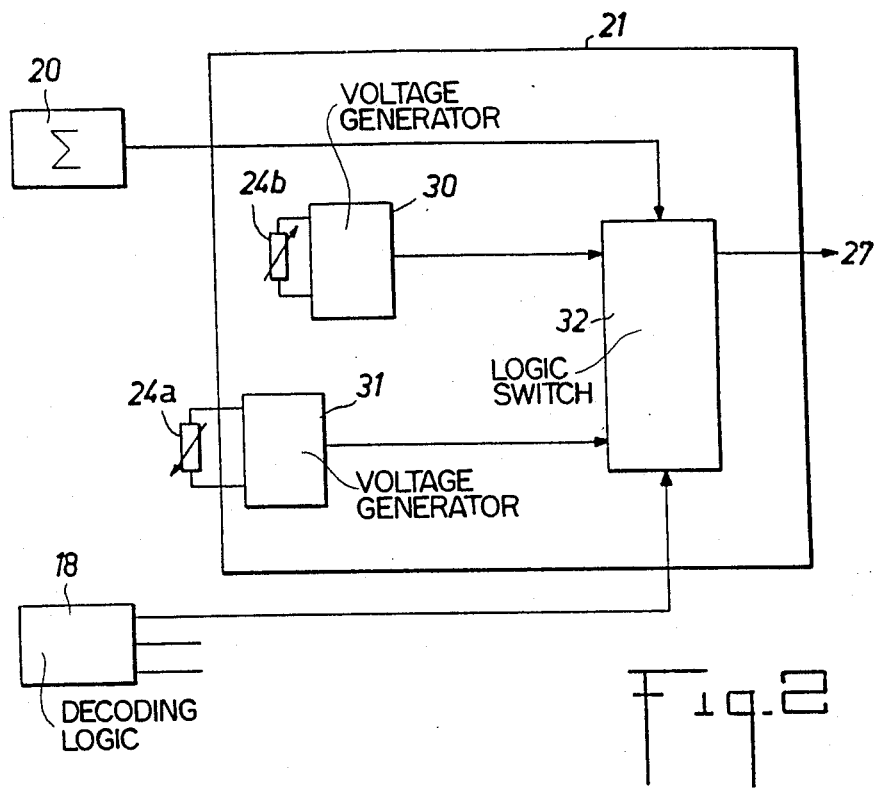
FIG. 2 represents an embodiment of the switching logic.

The switching logic illustrated in FIG. 2 includes two adjustable voltage generators, 30, 31. Generator 30 adjusts the black level to turn off the beam when not stimulated or when the stimulation color is not selected. Generator 31 sets the color level required for creation of the neutral band. Transistorized logic switch 32, controlled by logic circuit 18, transfers the brightness signal from summing circuit 20, the black level or the level required to produce the neutral band to normalizing circuits 27, 28, 29. Adjustable resistors 24a and 24b associated with generators 30 and 31 allow adjustments of the voltage level to obtain the required black and color levels.

Figure 3:
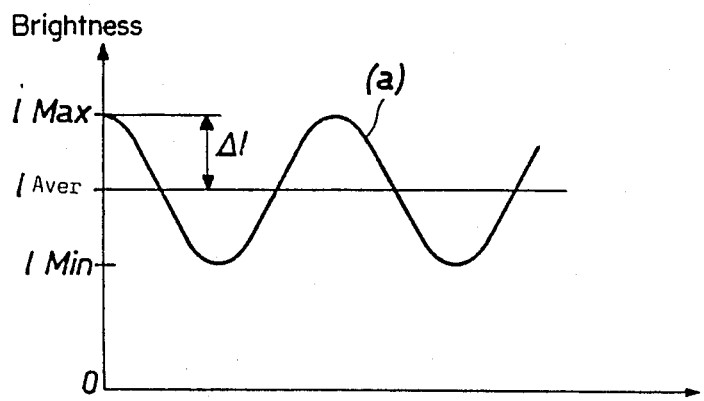
FIG. 3 represents an example of the brightness profile of an image displayed by the instrument according to the invention for examination of the brightness constrast sensitivity of the visual system.

FIG. 3 shows the profile of a brightness contrasted sinusoidal pattern which forms a primary image structure displayed on a CRT to allow measurement of the brightness contrast sensitivity of the visual system.

Each sinusoidal pattern defining a sinusoidal curve such as curve a of FIG. 3 is characterized by the spatial frequency of the signal, in cycles per degree (the degrees are on the X-axis of FIG. 3), the average brightness I Aver and the contrast C defined from the maximum brightness I Max and minimum brightness I Min on the Y-axis of FIG. 1, according to equation (1) below:

$$C = (I\,\text{Max} - I\,\text{Min})/(I\,\text{Max} + I\,\text{Min}) \quad (1)$$

which becomes, according to the average brightness I Aver and the difference $\Delta I$ between the average brightness and the maximum illuminace:

$$C = \Delta I / I\,\text{Aver} \quad (2)$$

The sensitivity of the visual system is such that it is capable of seeing contrasts of less than 0.01.

The requirement for displaying test images with a very low contrast means that it is necessary to use patterns with very small differences between brightness.

Figure 6:
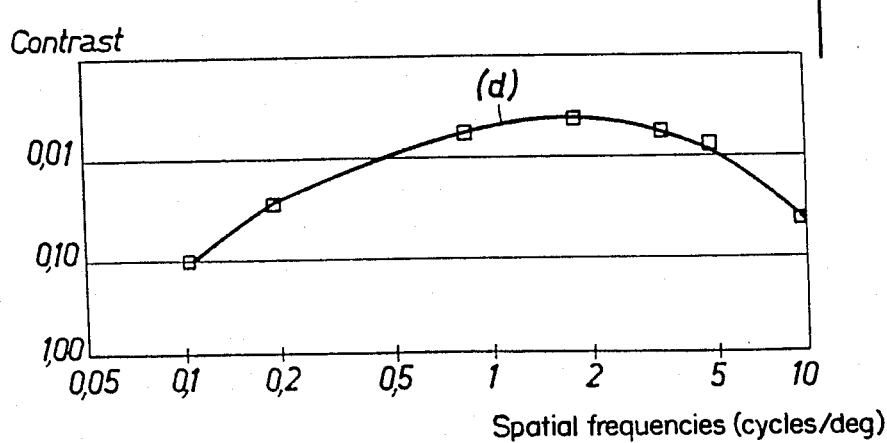
FIG. 6 shows the shape of the curve of contrast sensitivity of the visual system versus the spatial frequency.
Figure 4:
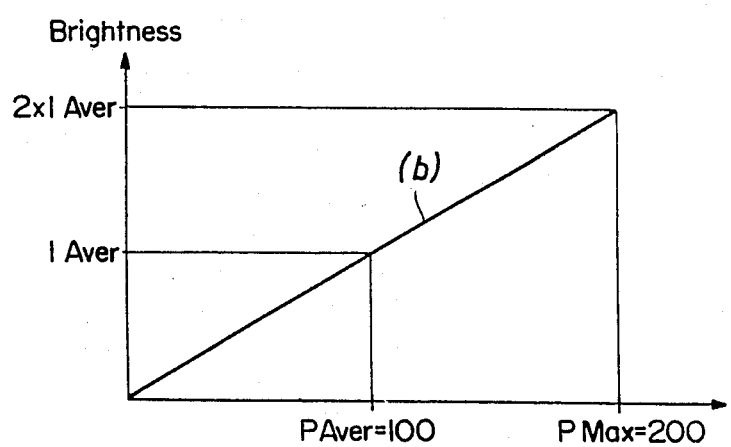
FIG. 4 shows the variation in the theoretical brightness values displayed versus the number of steps of the graphic processor.

FIG. 4 shows curve b giving the brightness versus the steps of the graphic processor in the case where it is considered that the response of the CRT phosphors is linear and the patterns displayed are squared. It should be noted that display of a contrast of 0.01 corresponds to a difference between extreme brightness equal to one percent of their average, which, in order to be discernable, requires the difference to correspond to at least one step and therefore requires having a graphic processor with at least 200 steps. However, the visual system can perceive contrasts below 0.01 (see curve d of FIG. 6) at medium spatial frequencies. In addition, because of the gamma of the CRT, the response of the phosphors to electronic excitation is not linear and in addition, the images displayed are sinusoidal patterns which means that all the levels are displayed instead of only two extreme levels.

To allow a reliable determination of contrast sensitivity and especially for fine measurement of the sensitivity at high values of sensitivity corresponding to low contrasts of approximately 0.01 to 0.03 or below, a graphic processor with around 1024 steps would have to be used. However, this capacity requires manipulating a large amount of memory space and can only be obtained on very costly and complex sophisticated processors. In effect, it is known that speed is the main criterion in design of a processor and that the larger the number of points to be displayed, the more and more problems it raises. Thus, insofar as scanning of a television line lasts less than 50 microseconds, each point is displayed on the screen for 100 nanoseconds if the line includes 500 points.

According to this invention, the use of graphic processors with a high number steps is avoided and, on the contrary, a relatively simple conventional graphic processor with, for instance, 256 gray levels is used with a dynamic range corrector system with a low-cost design to allow display of a greater number of low contrasts than using a simple graphic processor with 256 gray levels which is normally suited only for exploring contrasts between approximately 1 and 0.3, i.e. a logarithmic half-unit.

The invention is also based on the observation that a relatively low number of gray levels (256) is sufficient to explore the logarithmic contrast half-unit, whatever its position. Actually, all the gray levels of the graphic processor are used several times, but in different ranges of voltage applied to the CRT to finely explore in each case part of the scale of perceptible contrasts. FIG. 5 shows curve c giving the brightness versus the input voltage of the monitor and shows various ranges, each of which is used to explore a smaller section of the average brightness curve. This effectively leads to modifying the dynamic range of the processor.

Where Ve represents the processor output voltage and Vs represents the dynamic range corrector output voltage, we have the following equation:

$$Vs = Vcg + Kg \times Ve \tag{3}$$

where Kg represents a constant factor depending on the range selected and Vcg represents a constant voltage depending on the range selected.

As an example, the dynamic range corrector can be adapted to define five exploration ranges, each corresponding to a minimum contrast and a maximum contrast, as follows:

| Range | Max. contrast | Min. contrast | Kg | Vcg |
|-------|---------------|---------------|------|-----|
| 0 | 1 | 0.3 | 0 | 0 |
| 1 | 0.3 | 0.1 | 0.3 | Vc1 |
| 2 | 0.1 | 0.03 | 0.1 | Vc2 |
| 3 | 0.03 | 0.01 | 0.03 | Vc3 |
| 4 | 0.01 | 0.003 | 0.01 | Vc4 |

The Vcg values for each range are determined after measuring the characteristics of the CRT phosphors, but are not particularly critical insofar as the parameter which must be accurately known is the contrast achieved and not the average brightness.

We claim:

1. A graphic processor output dynamic range corrector for use in a brightness contrast analysis instrument to display stimuli at various spatial and time frequencies, including:
   a graphic processor for producing a brightness signal and synchronization signals;
   attenuator means, connected to said graphic processor for receiving said brightness signal, and having an adjustable attenuation coefficient;
   reference voltage generator means having an adjustable voltage level;
   summing circuit means for receiving and summing output signals from said attenuator means and said reference voltage generator means to produce a corrected brightness signal; and
   means for adjusting the adjustable attenuation coefficient of the attenuator means and for adjusting the adjustable voltage level of the reference voltage generator means.

2. The graphic processor output dynamic range corrector as recited in claim 8, wherein the values of the attenuation coefficient and the values of the reference voltage level are adjustable in a series of discrete values together forming different sensitivity ranges for each of a plurality of elementary brightness signal levels produced by the graphic processor.

3. A graphic processor output dynamic range corrector as recited in claim 1, wherein the attenuator means and the reference voltage generator means each comprise adjustable resistive circuits controlled by said means for adjusting.

4. A graphic processor output dynamic range corrector as recited in claim 1, further comprising three switching logic circuits, red, green and blue, respectively, each connected to the corrected brightness signal produced by the summing circuit means, for respectively applying corrected brightness signals from the summing circuit means to a red gun, a green gun and a blue gun respectively of the CRT.

5. A graphic processor output dynamic range corrrector as recited in claim 4, further including means for manually adjusting an excitation level of each of the red, green and blue guns; and
   means, responsive to said synchronization signals produced by said graphic processor, for controlling selective or simultaneous operation of said red, blue and green guns.

6. A graphic processor output dynamic range corrector as recited in claim 5 further including an input interface comprising a universal asynchronous receiver-transmitter connected between said means for adjusting and said attenuator means and said reference voltage generator means, respectively.

7. A graphic processor output dynamic range corrector as recited in claim 6 wherein said adjustable attenuation coefficient of said attenuator means can take five different values, and wherein the adjustable reference voltage level of the reference voltage level generator means can take five different levels.

* * * * *